(12) United States Patent
Fisher

(10) Patent No.: US 10,511,908 B1
(45) Date of Patent: Dec. 17, 2019

(54) AUDIO DENOISING AND NORMALIZATION USING IMAGE TRANSFORMING NEURAL NETWORK

(71) Applicant: Adobe Inc., San Jose, CA (US)

(72) Inventor: Matthew Fisher, Palo Alto, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/298,315

(22) Filed: Mar. 11, 2019

(51) Int. Cl.
| | |
|---|---|
| *H04B 15/00* | (2006.01) |
| *H04R 3/04* | (2006.01) |
| *G10L 21/0232* | (2013.01) |
| *G06N 20/00* | (2019.01) |
| *G06N 3/08* | (2006.01) |
| *G10L 21/0224* | (2013.01) |

(52) U.S. Cl.
CPC .................. *H04R 3/04* (2013.01); *G06N 3/08* (2013.01); *G06N 20/00* (2019.01); *G10L 21/0224* (2013.01); *G10L 21/0232* (2013.01)

(58) Field of Classification Search
CPC ........... H04R 5/033; H04R 5/04; G06F 3/017; G06F 3/16
See application file for complete search history.

(56) References Cited

U.S. PATENT DOCUMENTS

| | | | |
|---|---|---|---|
| 2007/0288242 A1* | 12/2007 | Spengler | G10L 15/20 704/275 |
| 2017/0330586 A1* | 11/2017 | Roblek | G06F 11/0715 |
| 2018/0033449 A1* | 2/2018 | Theverapperuma | G10L 25/30 |
| 2018/0261213 A1* | 9/2018 | Arik | G10L 15/16 |
| 2019/0066713 A1* | 2/2019 | Mesgarani | G10L 25/30 |
| 2019/0244601 A1* | 8/2019 | Rusak | G10L 15/08 |
| 2019/0251952 A1* | 8/2019 | Arik | G10L 13/08 |

* cited by examiner

*Primary Examiner* — Simon King
(74) *Attorney, Agent, or Firm* — Finch & Maloney PLLC

(57) ABSTRACT

Techniques are disclosed for reducing noise from an audio signal. A methodology implementing the techniques according to an embodiment includes generating a 2-dimensional (2D) spectrogram of a received audio signal and applying the 2D spectrogram to an image transformation neural network that is trained to transform the 2D spectrogram to generate an output spectrogram representing a denoised version of the received audio signal. The method further includes converting the output spectrogram to the time domain to generate the denoised audio signal. The neural network is trained on spectrogram images of clean and corrupted versions of training audio signals such that the trained neural network converts a spectrogram image of a corrupted audio signal into a spectrogram image more closely resembling a spectrogram of the associated clean audio signal. The denoising may also include removal of other degradation effects, including reverberation, unwanted voices, and unwanted music, from an audio signal.

20 Claims, 8 Drawing Sheets

Audio Denoising System
100

AUDIO DENOISING AND NORMALIZATION USING IMAGE TRANSFORMING NEURAL NETWORK

FIELD OF THE DISCLOSURE

This disclosure relates to audio processing. Particularly, this disclosure relates to techniques for audio denoising and normalization using image transforming neural networks.

BACKGROUND

Producers of media content often do not have access to recording studios or professional recording equipment, both of which can be prohibitively expensive for individuals or smaller content providers. Many audio recordings are obtained using lower-end devices such as mobile phones and the like, which can result in distortion of the recordings. Additionally, such recordings may be made in noisy environments where interfering sources such as conversations, music, and other background noise can further degrade the quality of the recordings.

DETAILED DESCRIPTION

Figure 1:
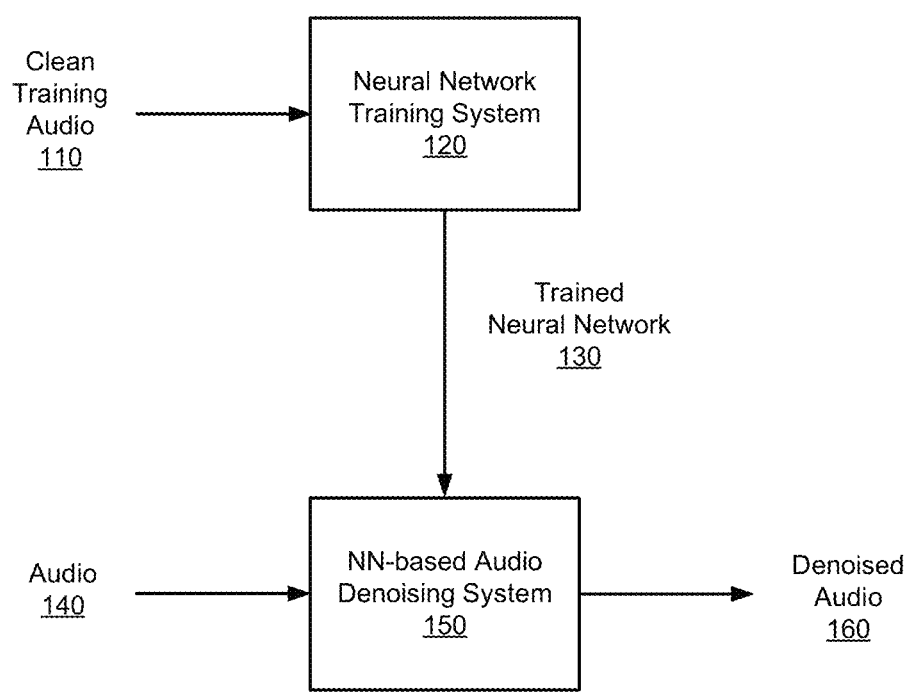
FIG. 1 is a top-level block diagram of an audio denoising system, configured in accordance with an embodiment of the present disclosure.

As noted previously, audio recordings are often obtained using lower-end equipment in adverse environments. For example, many small media producers do not have access to full recording studios, or they may be recording live audio in open environments which introduce interfering audio sources, over which the producers have little or no control. Such lower-end equipment can introduce frequency distortion and stationary noise, such as background hiss, to the recorded audio signal. Additionally, challenging recording environments can add reverberation or echo effects as well as non-stationary interfering noise, such as unwanted voices, music, ringing phones, intermittent fans, and other undesired background audio signals, to the recorded target audio signal. Non-stationary noise can be particularly difficult to deal with using conventional methods because of the time-varying/intermittent nature of such noise, unlike stationary noise (e.g., a background hiss) which remains relatively constant. The resultant recordings can be unsatisfactory for many purposes.

Some existing techniques attempt to improve the quality of recorded audio by filtering out frequency ranges that are believed to be noise-heavy, which are typically learned from a noise sample such as an otherwise silent period at the beginning of the recording. Other techniques may attempt to equalize sound levels by averaging frequencies in selected ranges and re-leveling them to desired baselines. Unfortunately, these existing techniques generally do not provide fully satisfactory results, as they cannot accurately predict the corrected signal values for suppressed frequencies, nor can they adapt to non-stationary (e.g., time varying) noise. Some other techniques use calibrated time domain filters to suppress reverberation and remove some noise, but the results are usually not satisfactory since it can be difficult to distinguish noise from desired signal. For purposes of calibrating the filters, and the methods are not data-driven, so they cannot be easily targeted to different domains or voices.

In light of these shortcomings associated with existing techniques, it would be desirable to have an audio denoising system that is capable of processing noisy audio to provide robust improvement in the quality of a recorded audio signal that has been corrupted, for example, in one or more of the previously described ways.

To this end, the present disclosure provides a neural network-based audio denoising system, which applies image processing techniques as a novel approach to the solution of a problem in the audio domain (denoising). In general, and according to an embodiment, audio denoising is accomplished by converting an audio signal into an image, as further explained below. The image-based representation of the audio signal is then applied to a neural network that has been trained to carry out noise reduction on a given image. The processed image is then converted back to a denoised audio signal.

Figure 3:
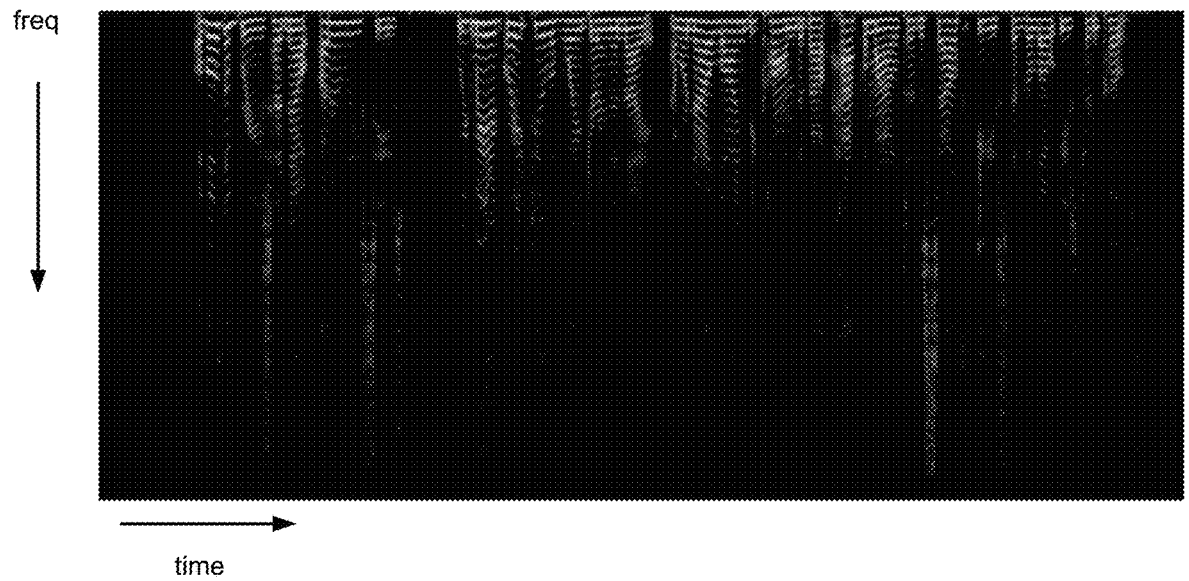
FIG. 3 illustrates spectrograms of clean audio data and noisy audio data, in accordance with an embodiment of the present disclosure.
Figure 3:
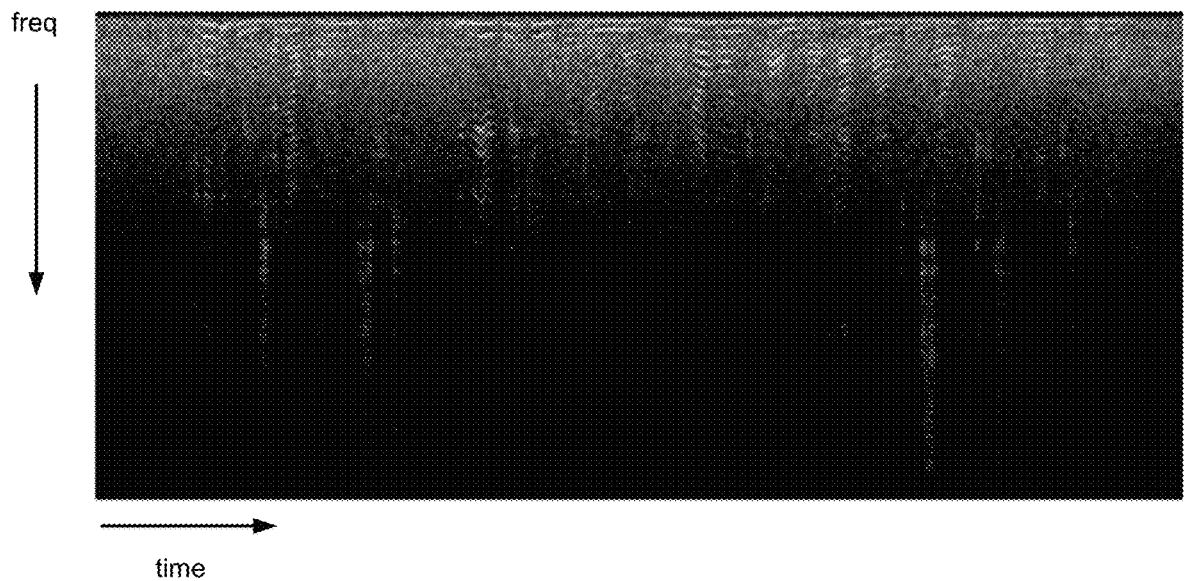

In more detail, audio signals can be represented as images by computing a 2-dimensional (2D) spectrogram of the audio signal. A spectrogram may be generated, for example, by segmenting the given audio signal into time slices (possibly overlapping), converting each of the segments into the frequency domain (for example using a Fast Fourier Transform—FFT), and mapping the resulting magnitudes in each frequency bin to a color scale (or a gray scale). Each of these color coded (or gray scale coded) frequency domain representations of the signal segments are stacked next to one another to create a 2D image, with frequency along one axis and time along the other axis. Some example spectrograms are illustrated in FIG. 3, and will be discussed in greater detail below.

In some embodiments, the neural network (NN) is configured for image transformation and is trained on 2D spectrogram images that were generated from pairings of clean and corrupted audio training signals, such that the trained NN can transform a spectrogram image of a corrupted audio signal into a spectrogram image of a relatively clean audio signal. Thus, and as will be appreciated in light of this disclosure, such embodiments apply example-based image transformation techniques to the audio domain. According to one such example embodiment, a 2D spectrogram image is generated from a received audio signal and applied to an image transformation NN. The NN transforms the spectrogram image into a new image that corresponds to the spectrogram of a denoised version of the received audio signal. The transformed image is then converted back into the time domain (from the frequency domain), for example using an inverse FFT or other techniques that will be apparent in light of the present disclosure, to produce the denoised or otherwise cleaned audio signal.

As will be further appreciated in light of this disclosure, the NN is trained on spectrogram images of clean and corrupted versions of training audio signals such that the trained NN converts a spectrogram image of a corrupted audio signal into a spectrogram image more closely resembling a spectrogram of the associated clean audio signal. The denoising may also include removal of other degradation effects, including reverberation, unwanted voices, and/or unwanted background music, from an audio signal, depending on the particular NN training process employed. For example, to remove reverberation the corrupted version of the training audio signal would include reverberation, which would in turn manifest in the corresponding image-based representation of that training audio signal. Similarly, to remove unwanted background music, the corrupted version of the training audio signal would include background music, which would in turn manifest in the corresponding image-based representation of that training audio signal.

Additionally, the NN may be trained to perform signal normalization or equalization to correct voice level distortion, as might be encountered when using a mobile microphone. In such case, the corrupted version of the training audio signal would include voice level distortion and the clean version of the training audio signal would be normalized to correct the distortion. Further still, the NN may be trained to remove selected voices from a conversation or to remove music or other interfering sounds. Conversely, the NN may be trained to retain music and remove voices, for example to generate karaoke or other sing-along soundtracks. In such case, the corrupted version of the training audio signal would include music and voice, while the clean version of the training audio signal would include only music (the voice having been removed). Still other applications include automatic audio improvement for media content being uploaded to video sharing web sites. In each case the NN is trained to transform the image of the 2D spectrogram corresponding to the corrupted audio signal to the 2D spectrogram corresponding to the clean audio signal.

Thus, the foregoing framework provides a neural network-based tool employing image transformation techniques to process audio signals (represented as images) for denoising, normalization/levelling, voice removal, music removal, and other applications as will be described below. The disclosed techniques provide an efficient and robust method for audio denoising, which can execute at near real-time data rates with little or no user supervision due to the fact that the NN is pre-trained to process the audio signal in accordance with any of the types of denoising described above. The execution time of the technique is relatively fast since the main components are a Fourier transform, an inverse Fourier transform, and a feed forward neural-network, all of which have relatively low computational complexity. These techniques offer significant advantages over existing methods that utilize relatively expensive audio processing equipment and/or require the operation of a skilled audio engineer, since the disclosed techniques can be executed on commonly available and relatively inexpensive computing platforms. Numerous configurations and variations will be apparent in light of this disclosure.

System Architecture

FIG. 1 is a top-level block diagram of an audio denoising system 100, configured in accordance with an embodiment of the present disclosure. As can be seen, the audio denoising system 100 comprises a neural network training system 120, to generate a trained neural network 130. The neural network is configured or trained to apply image transformation techniques to the audio domain. The system 100 further comprises a neural network-based audio denoising system 150, the operations of which will be described in greater detail below.

At a high-level, in an embodiment, the system accepts as training input, a body of clean audio recordings that may have been recorded in a low-noise environment such as a recording studio and may have been professionally processed, for example, by an audio engineer. The system then creates one or more artificial distortions, such as reverberation, noise, frequency perturbation, interfering signals, etc., depending on the application of interest. The image transformation neural network 130 is then trained on spectrograms of the training input and spectrograms of the associated corrupted/distorted audio such that the network can learn to transform the latter to the former. Then, in operation, spectrograms of "real-world" corrupted audio can be transformed by the trained network, and subsequently inverted back to the time domain to reconstruct a clean version of the audio signal, so long as the nature of the corruption matches the distortions that were employed in the training process. For example, if the NN is trained to remove voices from training audio signals that include voices and music, the NN can then be applied to "real-world" audio in which the corruption manifests itself as voices added to music, to generate denoised audio containing just the music.

Figure 2:
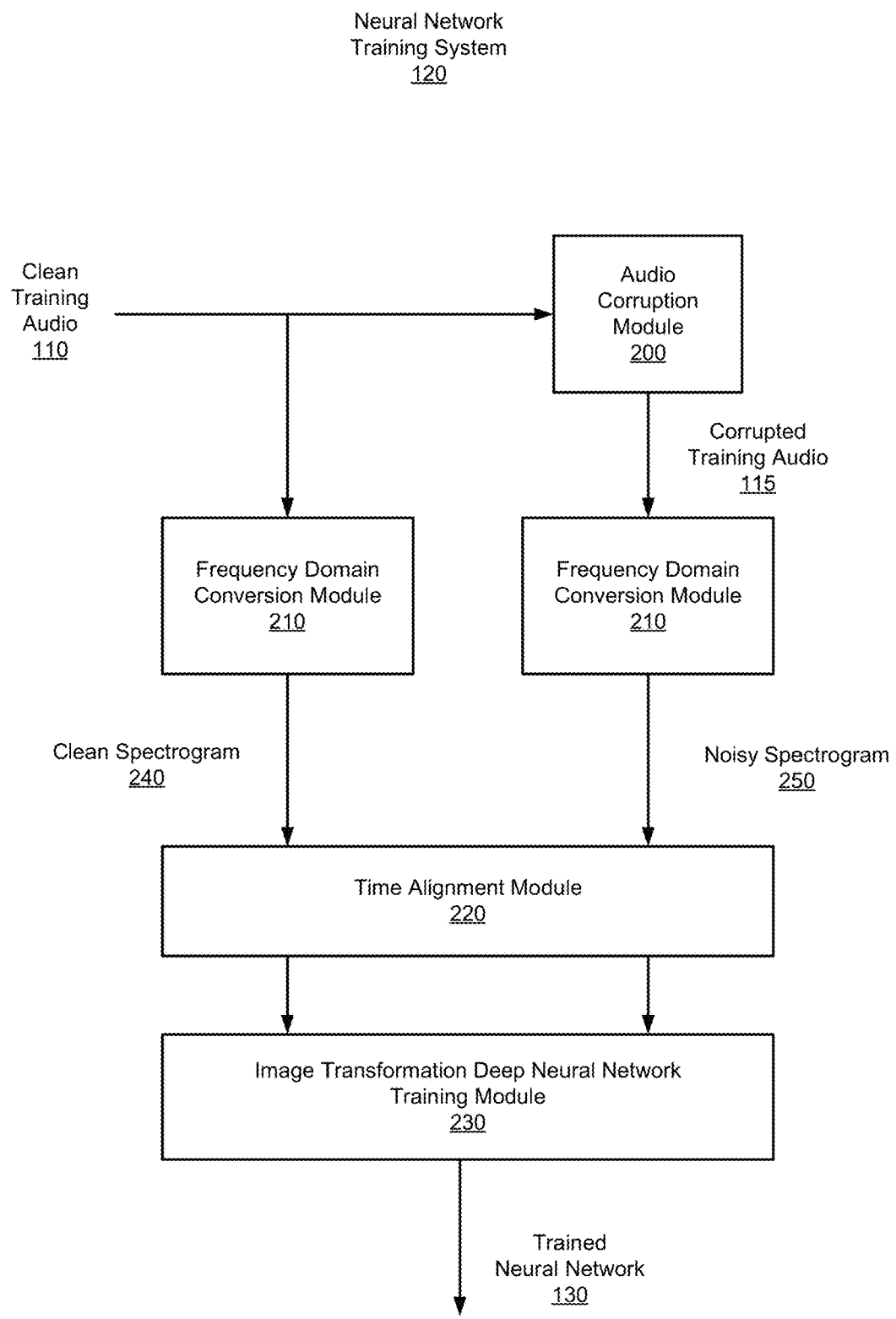
FIG. 2 is a block diagram of a neural network (NN) training system for use in the audio denoising system of FIG. 1, configured in accordance with an embodiment of the present disclosure.

FIG. 2 is a block diagram of a neural network (NN) training system 120 for audio denoising, configured in accordance with an embodiment of the present disclosure. The NN training system 120 is shown to include an audio corruption module 200, frequency domain conversion modules 210, time alignment module 220, and an image transformation deep neural network training module 230.

The audio corruption module 200 is configured to generate a corrupted version 115 of the clean training audio 110. In some embodiments, the corrupted audio signal 115 may be generated by one or more of the following operations: adding reverberation (e.g., echo effects) to the training audio signal, adding white noise (or colored noise) to the training audio signal, adding sampled noise (e.g., non-stationary noise) to the training audio signal, and applying frequency distortion to the training audio signal. Sampled noise may include, for example, sources of audio interference such as music, voices/conversations, ringing phones, mechanical or environmental sounds and the like.

In some embodiments, the corrupted audio signal 115 may be generated by recording a broadcast or replaying of pre-recorded clean audio in a noisy environment. For example, relatively clean audio may be played through a speaker of a first audio capable device (such as a smartphone or tablet, etc.) in a noisy environment (such as an outdoor location). The resulting corrupted audio is recorded on a second audio capable device. This technique can generate more realistic noise profiles/environments. These real-world noise cases may be used for only a selected percentage of the overall training, and may include a variety of combinations of noisy environments and audio devices (for broadcasting and recording).

The frequency domain conversion modules 210 are configured to generate frequency domain spectrograms from the time domain audio signals. In particular, a clean spectrogram 240 is generated from the clean training audio 110, and a noisy spectrogram 250 is generated from the corrupted training audio signal 115 generated by module 200. In some embodiments, the spectrograms may be generated using short-time Fourier transforms (STFTs). In some embodiments, the STFT may use a window length of 1024 and a step size of 128. A logarithm function may then be applied to the magnitude of the STFT image, and the resulting values may be clamped to audible thresholds.

The spectrograms are 2-dimensional (2D) images with frequency along one axis, time along the other axis, and brightness (or color) at each pixel proportional to the signal intensity or logarithmic magnitude at that associated frequency and time bin. This is illustrated in FIG. 3, which shows the example spectrograms of clean audio data 240 and noisy audio data 250, in accordance with an embodiment of the present disclosure.

The time alignment module 220 is configured to perform time alignment between the 2D spectrogram of the training audio signal and the 2D spectrogram of the corrupted audio signal, in preparation for training of the neural network, such that the sounds of each corrupted frame align precisely in time with the sounds of each clean frame.

The image transformation deep neural network training module 230 is configured to generate a trained image transformation deep neural network 130 based on minimization of a loss function between the 2D spectrogram 240 of the clean training audio signal and the results of processing of the 2D spectrogram 250 of the corrupted audio signal, generated during an iteration of the training of the neural network. Said differently, the training iterations serve to configure the neural network to perform an image transformation on the 2D spectrogram 250 of the corrupted training audio signal such that the transformed image more closely resembles the 2-D spectrogram 240 of the clean training audio signal. In some embodiments, the network 130 may be parameterized by a generator, a discriminator, and a loss type. The generator may be a dilated residual network with skip connections, and the discriminator may be a fully convolutional network trained with a Wasserstein Generative Adversarial Network gradient penalty loss type.

Figure 4:
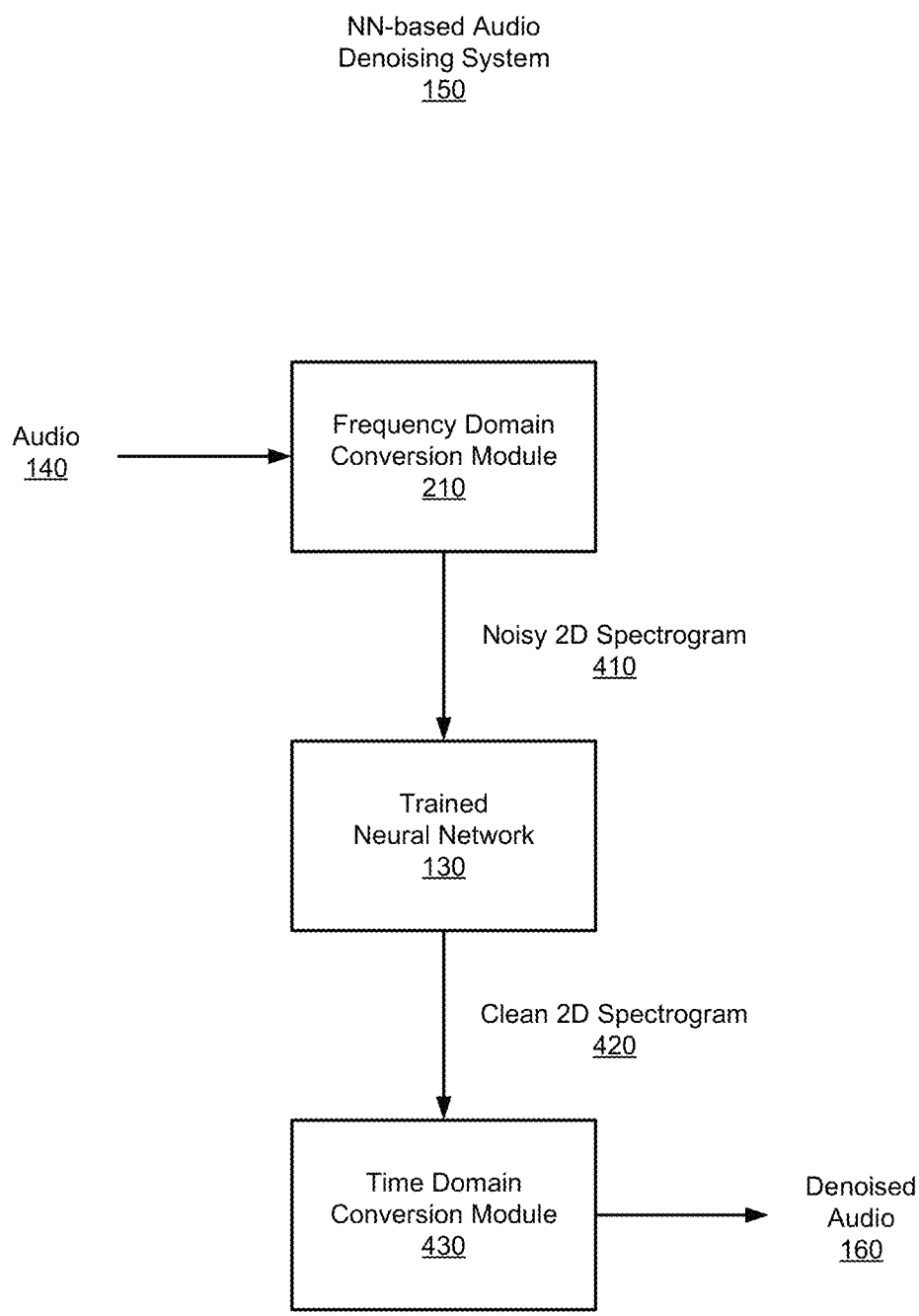
FIG. 4 is a block diagram of an NN-based audio denoising system for use in the audio denoising system of FIG. 1, configured in accordance with an embodiment of the present disclosure.

FIG. 4 is a more detailed block diagram of an NN-based audio denoising system 150, configured in accordance with an embodiment of the present disclosure. The NN-based audio denoising system 150 is shown to include frequency domain conversion module 210, the trained image transformation deep neural network 130, and time domain conversion module 430.

The frequency domain conversion module 210 is configured to generate a 2D spectrogram 410 of a received audio signal 140. The 2D spectrogram 410 is referred to as the noisy 2D spectrogram because it is associated with received audio signal 140 which will typically be noisy or corrupted in some fashion.

The trained image transformation deep neural network 130 is configured to perform image transformation on the 2D spectrogram 410 to generate a cleaned output spectrogram 420. The output spectrogram is a frequency domain representation of a desired denoised version of the received audio signal 140. In some embodiments, the neural network 130 is a Generative Adversarial deep neural network, configured for image transformation. In some embodiments, the neural network 130 may be implemented using ResNet, U-Net, or other neural networks, in light of the present disclosure.

The time domain conversion module 430 is configured to generate the result, a denoised audio signal 160, by performing an inverse STFT on the clean 2D spectrogram 420 to convert that spectrogram back to the time domain. As previously explained, spectrograms encode only the magnitude of the signal in the frequency domain, the phase is not used. As such, when converting the clean 2D spectrogram back to the time domain, a phase component needs to be provided. In some embodiments, the time domain conversion module 430 is further configured to use the original phase information from the received audio signal 140 as the phase of the generated denoised audio signal 160. In some embodiments, other known techniques in light of the present disclosure, such as the Griffith-Lim algorithm or waveform decoding, may be used to reconstruct the phase.

Figure 5:
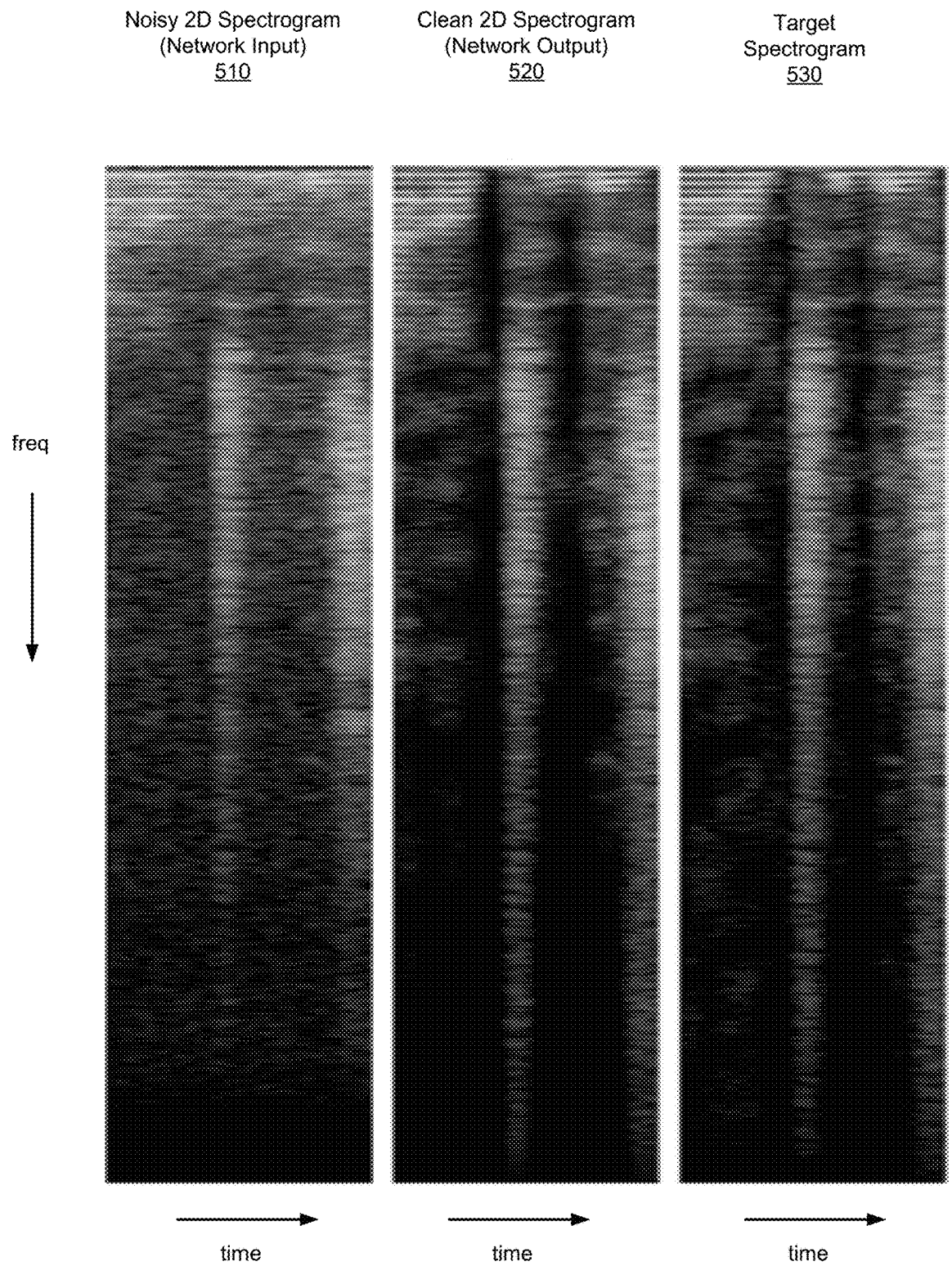
FIG. 5 illustrates spectrograms of audio data associated with the audio denoising process, in accordance with an embodiment of the present disclosure.

FIG. 5 illustrates spectrograms of audio data associated with the audio denoising process, in accordance with an embodiment of the present disclosure. FIG. 510 shows an example of a noisy 2D spectrogram 410 which is input to the neural network 130. FIG. 520 shows the resultant clean 2D spectrogram 420 which is output from the neural network 130. For comparison, FIG. 530 shows a target 2D spectrogram, for example, as would be obtained from a frequency conversion of a clean version of the received audio signal, if it were available. As can be seen, the clean 2D spectrogram 520 closely resembles the target spectrogram 530, indicating that noise and other forms of corruption have been reduced or eliminated.

In some embodiments, the neural network 130 may be trained to remove selected varieties of nonstationary noise, such as, for example, background music, a ringing phone, traffic noise, an intermittent fan, or other mechanical type interfering sounds. In such cases, the corrupted version of the training audio signal would include the background music, ringing phone, traffic noise, intermittent fan, etc., while the clean version of the training audio signal would include only the audio of interest. The neural network 130 may also be trained to remove voices other than a single (or selected few) desired voices, by training on clean audio containing the desired voice and corrupted audio containing the additional undesired voices. The network may also be trained to correct for frequency distortion, for example, by applying a random, time-varying equalization function for the generation of the corrupted training audio.

Methodology

Figure 6:
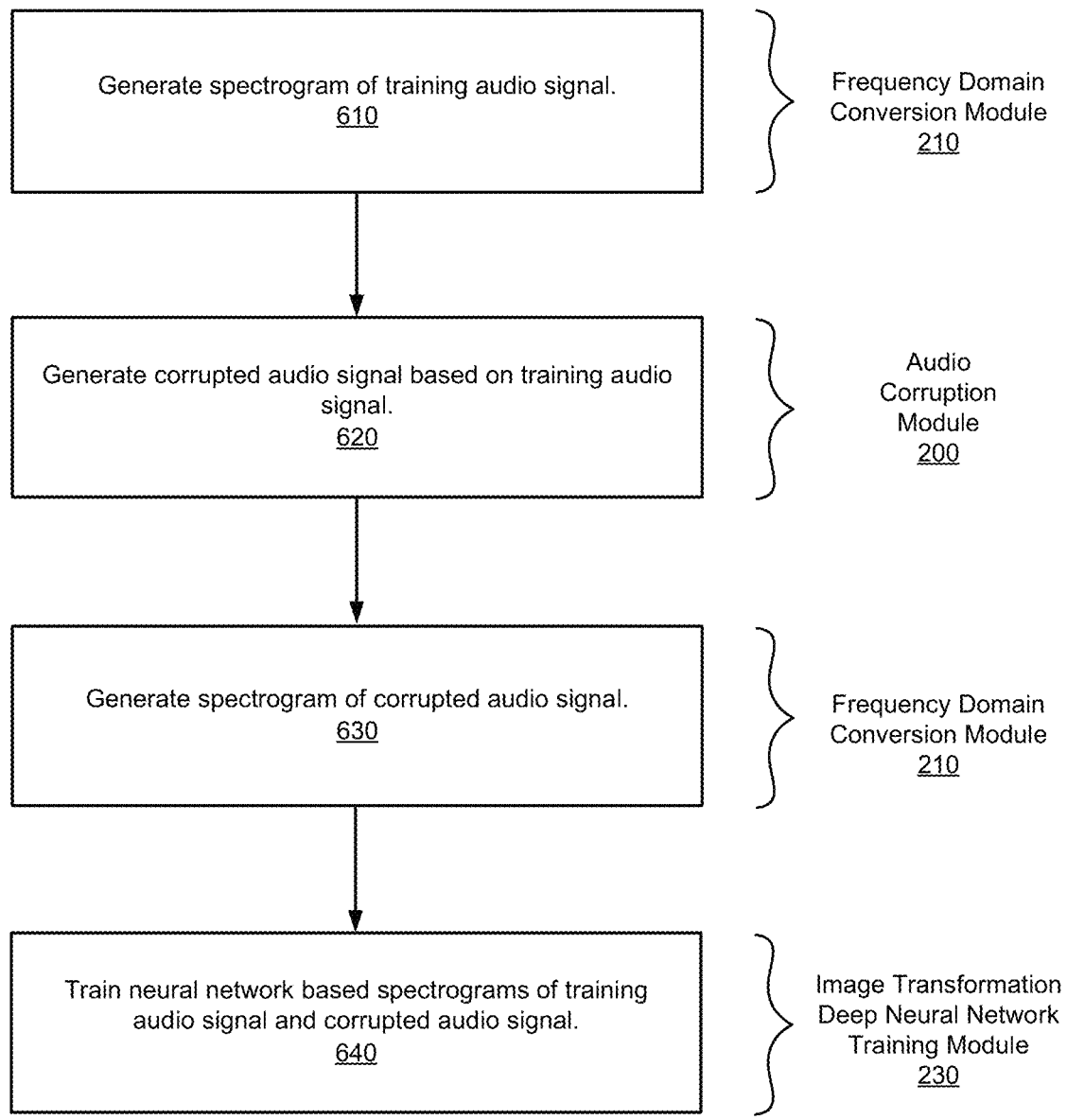
FIG. 6 is a flowchart illustrating a method for training an audio denoising neural network, in accordance with an embodiment of the present disclosure.

FIG. 6 is a flowchart 600 illustrating a method for training an audio denoising neural network, in accordance with an embodiment of the present disclosure. As can be seen, the method is described with reference to the configuration of frequency domain conversion module 210, audio corruption module 200, and image transformation deep neural network training module 230, of FIG. 2. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences, at operation 610, by generating a 2D spectrogram image of a training audio signal. In some embodiments, the spectrogram generation may be performed, as a short-time Fourier transform.

The method continues, at operation 620, by generating a corrupted audio signal based on the training audio signal. In some embodiments, the corrupted audio signal may be generated by adding reverberation to the training audio signal, adding white noise to the training audio signal, adding sampled noise to the training audio signal, and/or applying frequency distortion to the training audio signal. Sampled noise may include, for example, voices, music, mechanical or environmental sounds, or any other types of interfering audio noise. In some embodiments, the corrupted audio signal may be generated by recording a broadcast of pre-recorded clean audio in a noisy environment.

At operation 630, a 2D spectrogram image of the corrupted audio signal is generated.

At operation 640, an image transformation neural network is trained based on minimization of a loss function between the 2D spectrogram of the training audio signal and a result of processing of the 2D spectrogram of the corrupted audio signal. The result of processing the 2D spectrogram of the corrupted audio signal is generated during an iteration of the training of the neural network.

In some embodiments, additional operations are performed. For example, in one embodiment, time alignment (e.g., time shifting the samples) may be performed between the 2D spectrogram of the training audio signal and the 2D spectrogram of the corrupted audio signal so that each audio event occurs at the same point in the frames of the two spectrograms.

Figure 7:
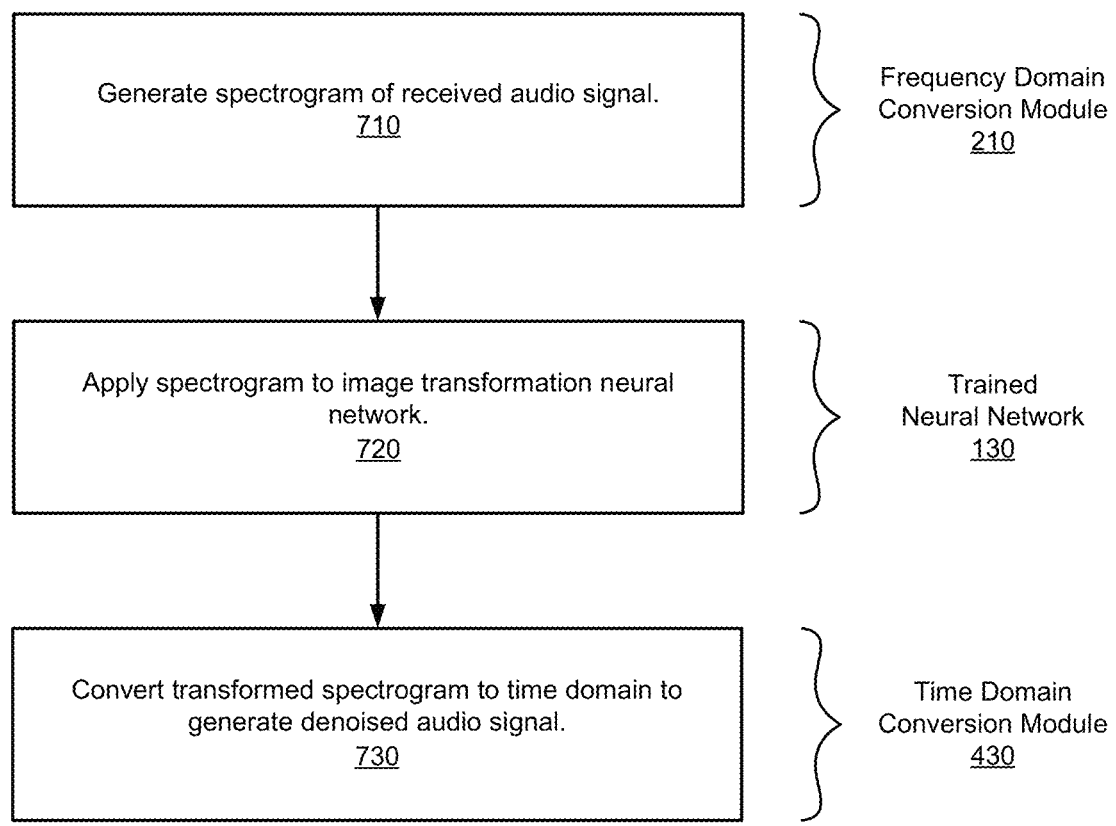
FIG. 7 is a flowchart illustrating a method for audio denoising, in accordance with an embodiment of the present disclosure.

FIG. 7 is a flowchart 700 illustrating a method for audio denoising, in accordance with an embodiment of the present disclosure. As can be seen, the method is described with reference to the configuration of frequency domain conversion module 210, trained neural network 130, and time domain conversion module 430, of FIGS. 1, 2 and 4. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration.

The method commences, at operation 710, by generating a 2D spectrogram of a received audio signal. In some embodiments, the spectrogram generation may be performed, as a short-time Fourier transform.

The method continues, at operation 720, by applying the 2D spectrogram to an image transformation neural network. The neural network is trained to perform image transformation on the 2D spectrogram, as previously described, to generate an output spectrogram representing a denoised version of the received audio signal. In some embodiments, the neural network is a generative adversarial deep neural network.

At operation 730, the output spectrogram is converted to the time domain to generate the denoised audio signal, by performing an inverse STFT or using other known methods in light of the present disclosure. As previously described, in some embodiments, the original phase information from the received audio signal is used as the phase of the generated denoised audio signal. In some embodiments, other known techniques in light of the present disclosure, such as the Griffith-Lim algorithm or waveform decoding, may be used to reconstruct the phase.

Example Platform

Figure 8:
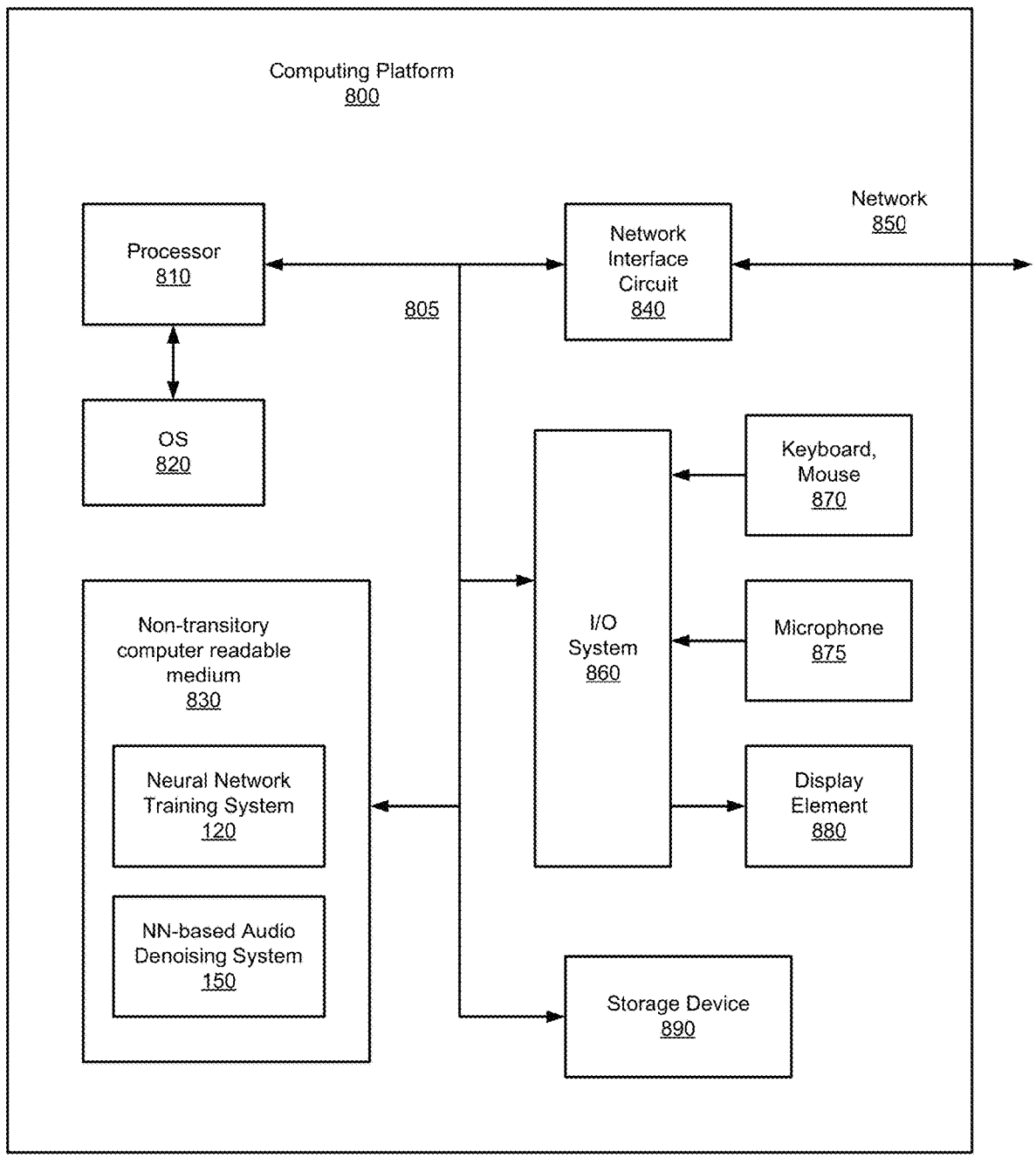
FIG. 8 is a block diagram schematically illustrating a computing platform configured to perform any of the techniques as variously described in this disclosure, configured in accordance with an embodiment of the present disclosure.

FIG. 8 is a block diagram schematically illustrating a computing platform 800 configured to perform any of the techniques as variously described in this disclosure, configured in accordance with an embodiment of the present disclosure. For example, in some embodiments, the neural network training system 120 of FIG. 2, the NN-based audio denoising system 150 of FIG. 4, or any portions thereof, and the methodologies of FIGS. 6 and 7, or any portions thereof, are implemented in the computing platform 800. In some embodiments, the computing platform 800 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing or telecommunications device that is capable of communication and that has sufficient processor power and memory capacity to perform the operations described in this disclosure. In some embodiments, a distributed computational system is provided comprising a plurality of such computing devices.

The computing platform 800 includes one or more storage devices 890 and/or non-transitory computer-readable media 830 having encoded thereon one or more computer-executable instructions or software for implementing techniques as variously described in this disclosure. In some embodiments, the storage devices 890 includes a computer system memory or random access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 890 includes other types of memory as well, or combinations thereof. In one embodiment, the storage device 890 is provided on the computing platform 800. In another embodiment, the storage device 890 is provided separately or remotely from the computing platform 800. The non-transitory computer-readable media 830 include, but are not limited to, one or more types of hardware memory, non-transitory tangible media (for example, one or more magnetic storage disks, one or more optical disks, one or more USB flash drives), and the like. In some embodiments, the non-transitory computer-readable media 830 included in the computing platform 800 store computer-readable and computer-executable instructions or software for implementing various embodiments. In one embodiment, the computer-readable media 830 are provided on the computing platform 800. In another embodiment, the computer-readable media 830 are provided separately or remotely from the computing platform 800.

The computing platform 800 also includes at least one processor 810 for executing computer-readable and computer-executable instructions or software stored in the storage device 890 and/or non-transitory computer-readable media 830 and other programs for controlling system hardware. In some embodiments, virtualization is employed in the computing platform 800 so that infrastructure and resources in the computing platform 800 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 805 is also provided to allow for communication between the various components listed above and/or other components not shown. Computing platform 800 can be coupled to a network 850 (e.g., a local or wide area network such as the internet), through network interface circuit 840 to allow for communications with other computing devices, platforms, resources, clients, and Internet of Things (IoT) devices.

In some embodiments, a user interacts with the computing platform 800 through an input/output system 860 that interfaces with devices such as a keyboard and mouse 870, a microphone, 875, and/or a display element (screen/monitor) 880 which provides a user interface to accept user input and guidance, for example to provide audio input for denoising and/or to configure or control the audio denoising system. In some embodiments, the computing platform 800 includes other I/O devices (not shown) for receiving input from a user, for example, a pointing device or a touchpad, etc., or any suitable user interface. In some embodiments, the computing platform 800 includes other suitable conventional I/O peripherals. The computing platform 800 can include and/or be operatively coupled to various suitable devices for performing one or more of the aspects as variously described in this disclosure.

In some embodiments, the computing platform 800 runs an operating system (OS) 820, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 800 and performing the operations described in this disclosure. In one embodiment, the operating system runs on one or more cloud machine instances.

As will be appreciated in light of this disclosure, the various modules and components of the system, including the neural network training system 120 and the NN-based audio denoising system 150, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing platform 800, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Numerous example embodiments will be apparent, and features described herein can be combined in any number of configurations.

Example 1 includes a method for denoising an audio signal, the method comprising: generating, by a processor-based system, a 2-dimensional (2D) spectrogram of a received audio signal; applying, by the processor-based system, the 2D spectrogram to a neural network, the neural network trained to perform image transformation on the 2D spectrogram to generate an output spectrogram, the output spectrogram representing a denoised audio signal based on the received audio signal; and converting, by the processor-based system, the output spectrogram to the time domain to generate the denoised audio signal.

Example 2 includes the subject matter of Example 1, wherein the neural network is trained by: generating a 2D spectrogram of a training audio signal; generating a corrupted audio signal based on the training audio signal; generating a 2D spectrogram of the corrupted audio signal; and performing training of the neural network based on minimization of a loss function between the 2D spectrogram of the training audio signal and a result of processing of the 2D spectrogram of the corrupted audio signal, the result of processing of the 2D spectrogram of the corrupted audio signal generated during an iteration of the training of the neural network.

Example 3 includes the subject matter of Examples 1 or 2, wherein generating the corrupted audio signal comprises one or more of adding reverberation to the training audio signal, adding white noise to the training audio signal, adding sampled noise to the training audio signal, applying frequency distortion to the training audio signal, and recording a broadcast of pre-recorded clean audio in a noisy environment.

Example 4 includes the subject matter of any of Examples 1-3, further comprising performing time alignment between the 2D spectrogram of the training audio signal and the 2D spectrogram of the corrupted audio signal.

Example 5 includes the subject matter of any of Examples 1-4, wherein generating the 2D spectrogram of the received audio signal comprises performing a short-time Fourier transform (STFT) on the received audio signal, and generating the denoised audio signal comprises performing an inverse STFT on the output spectrogram.

Example 6 includes the subject matter of any of Examples 1-5, further comprising incorporating phase information from the received audio signal for the generation of the denoised audio signal.

Example 7 includes the subject matter of any of Examples 1-6, wherein the neural network is a generative adversarial deep neural network.

Example 8 is a system for denoising an audio signal, the system comprising: one or more processors; a frequency domain conversion module at least one of controllable and executable by the one or more processors, and configured to generate a 2-dimensional (2D) spectrogram of a received audio signal; a neural network at least one of controllable and executable by the one or more processors, and trained to perform image transformation on the 2D spectrogram to generate an output spectrogram, the output spectrogram representing a denoised audio signal based on the received audio signal; and a time domain conversion module at least one of controllable and executable by the one or more processors, and configured to convert the output spectrogram to the time domain to generate the denoised audio signal.

Example 9 includes the subject matter of Example 8, wherein the neural network is trained by: generating a 2D spectrogram of a training audio signal; generating a corrupted audio signal based on the training audio signal; generating a 2D spectrogram of the corrupted audio signal; and performing training of the neural network based on minimization of a loss function between the 2D spectrogram of the training audio signal and a result of processing of the 2D spectrogram of the corrupted audio signal, the result of processing of the 2D spectrogram of the corrupted audio signal generated during an iteration of the training of the neural network.

Example 10 includes the subject matter of Examples 8 or 9, wherein generating the corrupted audio signal comprises one or more of adding reverberation to the training audio signal, adding white noise to the training audio signal, adding sampled noise to the training audio signal, applying frequency distortion to the training audio signal, and recording a broadcast of pre-recorded clean audio in a noisy environment.

Example 11 includes the subject matter of any of Examples 8-10, further comprising performing time alignment between the 2D spectrogram of the training audio signal and the 2D spectrogram of the corrupted audio signal.

Example 12 includes the subject matter of any of Examples 8-11, wherein the frequency domain conversion module is further configured to perform a short-time Fourier transform (STFT) on the received audio signal to generate the 2D spectrogram of the received audio signal, and the time domain conversion module is further configured to perform an inverse STFT on the output spectrogram to generate the denoised audio signal.

Example 13 includes the subject matter of any of Examples 8-12, wherein the time domain conversion module is further configured to incorporate phase information from the received audio signal for the generation of the denoised audio signal.

Example 14 includes the subject matter of any of Examples 8-13, wherein the neural network is a generative adversarial deep neural network.

Example 15 is a non-transitory computer program product having instructions encoded thereon that when executed by one or more processors cause a process to be carried out for denoising an audio signal, the process comprising: generating a 2-dimensional (2D) spectrogram of a received audio signal; applying the 2D spectrogram to a neural network, the neural network trained to perform image transformation on the 2D spectrogram to generate an output spectrogram, the output spectrogram representing a denoised audio signal based on the received audio signal; and converting the output spectrogram to the time domain to generate the denoised audio signal.

Example 16 includes the subject matter of Example 15, wherein training of the neural network comprises: generating a 2D spectrogram of a training audio signal; generating a corrupted audio signal based on the training audio signal; generating a 2D spectrogram of the corrupted audio signal; and performing training of the neural network based on minimization of a loss function between the 2D spectrogram of the training audio signal and a result of processing of the 2D spectrogram of the corrupted audio signal, the result of processing of the 2D spectrogram of the corrupted audio signal generated during an iteration of the training of the neural network.

Example 17 includes the subject matter of Examples 15 or 16, wherein generating the corrupted audio signal comprises one or more of adding reverberation to the training audio signal, adding white noise to the training audio signal, adding sampled noise to the training audio signal, applying frequency distortion to the training audio signal, and recording a broadcast of pre-recorded clean audio in a noisy environment.

Example 18 includes the subject matter of any of Examples 15-17, further comprising performing time alignment between the 2D spectrogram of the training audio signal and the 2D spectrogram of the corrupted audio signal.

Example 19 includes the subject matter of any of Examples 15-18, wherein generating the 2D spectrogram of the received audio signal comprises performing a short-time Fourier transform (STFT) on the received audio signal, and generating the denoised audio signal comprises performing an inverse STFT on the output spectrogram.

Example 20 includes the subject matter of any of Examples 15-19, further comprising incorporating phase information from the received audio signal for the generation of the denoised audio signal.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for denoising an audio signal, the method comprising:
    generating, by a processor-based system, a 2-dimensional (2D) spectrogram of a received audio signal;
    applying, by the processor-based system, the 2D spectrogram to a neural network, the neural network trained to perform image transformation on the 2D spectrogram to generate an output spectrogram, the output spectrogram representing a denoised audio signal based on the received audio signal; and
    converting, by the processor-based system, the output spectrogram to the time domain to generate the denoised audio signal.

2. The method of claim 1, wherein the neural network is trained by:
    generating a 2D spectrogram of a training audio signal;
    generating a corrupted audio signal based on the training audio signal;
    generating a 2D spectrogram of the corrupted audio signal; and
    performing training of the neural network based on minimization of a loss function between the 2D spectrogram of the training audio signal and a result of processing of the 2D spectrogram of the corrupted audio signal, the result of processing of the 2D spectrogram of the corrupted audio signal generated during an iteration of the training of the neural network.

3. The method of claim 2, wherein generating the corrupted audio signal comprises one or more of adding reverberation to the training audio signal, adding white noise to the training audio signal, adding sampled noise to the training audio signal, applying frequency distortion to the training audio signal, and recording a broadcast of pre-recorded clean audio in a noisy environment.

4. The method of claim 2, further comprising performing time alignment between the 2D spectrogram of the training audio signal and the 2D spectrogram of the corrupted audio signal.

5. The method of claim 1, wherein generating the 2D spectrogram of the received audio signal comprises performing a short-time Fourier transform (STFT) on the received audio signal, and generating the denoised audio signal comprises performing an inverse STFT on the output spectrogram.

6. The method of claim 5, further comprising incorporating phase information from the received audio signal for the generation of the denoised audio signal.

7. The method of claim 1, wherein the neural network is a generative adversarial deep neural network.

8. A system for denoising an audio signal, the system comprising:
one or more processors;
a frequency domain conversion module at least one of controllable and executable by the one or more processors, and configured to generate a 2-dimensional (2D) spectrogram of a received audio signal;
a neural network at least one of controllable and executable by the one or more processors, and trained to perform image transformation on the 2D spectrogram to generate an output spectrogram, the output spectrogram representing a denoised audio signal based on the received audio signal; and
a time domain conversion module at least one of controllable and executable by the one or more processors, and configured to convert the output spectrogram to the time domain to generate the denoised audio signal.

9. The system of claim 8, wherein the neural network is trained by:
generating a 2D spectrogram of a training audio signal;
generating a corrupted audio signal based on the training audio signal;
generating a 2D spectrogram of the corrupted audio signal; and
performing training of the neural network based on minimization of a loss function between the 2D spectrogram of the training audio signal and a result of processing of the 2D spectrogram of the corrupted audio signal, the result of processing of the 2D spectrogram of the corrupted audio signal generated during an iteration of the training of the neural network.

10. The system of claim 9, wherein generating the corrupted audio signal comprises one or more of adding reverberation to the training audio signal, adding white noise to the training audio signal, adding sampled noise to the training audio signal, applying frequency distortion to the training audio signal, and recording a broadcast of pre-recorded clean audio in a noisy environment.

11. The system of claim 9, further comprising performing time alignment between the 2D spectrogram of the training audio signal and the 2D spectrogram of the corrupted audio signal.

12. The system of claim 8, wherein the frequency domain conversion module is further configured to perform a short-time Fourier transform (STFT) on the received audio signal to generate the 2D spectrogram of the received audio signal, and the time domain conversion module is further configured to perform an inverse STFT on the output spectrogram to generate the denoised audio signal.

13. The system of claim 12, wherein the time domain conversion module is further configured to incorporate phase information from the received audio signal for the generation of the denoised audio signal.

14. The system of claim 8, wherein the neural network is a generative adversarial deep neural network.

15. A non-transitory computer program product having instructions encoded thereon that when executed by one or more processors cause a process to be carried out for denoising an audio signal, the process comprising:
generating a 2-dimensional (2D) spectrogram of a received audio signal;
applying the 2D spectrogram to a neural network, the neural network trained to perform image transformation on the 2D spectrogram to generate an output spectrogram, the output spectrogram representing a denoised audio signal based on the received audio signal; and
converting the output spectrogram to the time domain to generate the denoised audio signal.

16. The non-transitory computer program product of claim 15, wherein training of the neural network comprises:
generating a 2D spectrogram of a training audio signal;
generating a corrupted audio signal based on the training audio signal;
generating a 2D spectrogram of the corrupted audio signal; and
performing training of the neural network based on minimization of a loss function between the 2D spectrogram of the training audio signal and a result of processing of the 2D spectrogram of the corrupted audio signal, the result of processing of the 2D spectrogram of the corrupted audio signal generated during an iteration of the training of the neural network.

17. The non-transitory computer program product of claim 16, wherein generating the corrupted audio signal comprises one or more of adding reverberation to the training audio signal, adding white noise to the training audio signal, adding sampled noise to the training audio signal, applying frequency distortion to the training audio signal, and recording a broadcast of pre-recorded clean audio in a noisy environment.

18. The non-transitory computer program product of claim 16, further comprising performing time alignment between the 2D spectrogram of the training audio signal and the 2D spectrogram of the corrupted audio signal.

19. The non-transitory computer program product of claim 15, wherein generating the 2D spectrogram of the received audio signal comprises performing a short-time Fourier transform (STFT) on the received audio signal, and generating the denoised audio signal comprises performing an inverse STFT on the output spectrogram.

20. The non-transitory computer program product of claim 19, further comprising incorporating phase information from the received audio signal for the generation of the denoised audio signal.

* * * * *